United States Patent
Hirano et al.

(10) Patent No.: US 10,420,358 B2
(45) Date of Patent: Sep. 24, 2019

(54) PROCESSED EGG AND METHOD FOR IDENTIFYING THE SAME

(71) Applicant: NISSIN FOODS HOLDINGS CO., LTD., Osaka-shi, Osaka (JP)

(72) Inventors: Yukio Hirano, Osaka (JP); Seiko Tamura, Osaka (JP)

(73) Assignee: Nissin Foods Holdings Co., Ltd., Osaka (JP)

(*) Notice: Subject to any disclaimer, the term of this patent is extended or adjusted under 35 U.S.C. 154(b) by 160 days.

(21) Appl. No.: 15/443,512

(22) Filed: Feb. 27, 2017

(65) Prior Publication Data

US 2017/0251706 A1    Sep. 7, 2017

(30) Foreign Application Priority Data

Mar. 3, 2016  (SG) .............................. 10201601639

(51) Int. Cl.
*A23L 15/00*        (2016.01)

(52) U.S. Cl.
CPC ............... *A23L 15/00* (2016.08); *A23L 15/30* (2016.08); *A23V 2002/00* (2013.01)

(58) Field of Classification Search
CPC ........ A23V 2002/00; A23V 2250/5428; A23V 2200/222; A23V 2200/00; A23L 15/00; A23L 15/35

See application file for complete search history.

(56) References Cited

U.S. PATENT DOCUMENTS

| | | | |
|---|---|---|---|
| 2003/0012859 A1 | 1/2003 | Efstathiou | |
| 2010/0112131 A1 | 5/2010 | Qiao et al. | |

FOREIGN PATENT DOCUMENTS

| | | |
|---|---|---|
| JP | 53-034960 | 3/1978 |
| JP | 8-009925 | 1/1996 |
| JP | 3012052 B | 12/1999 |
| JP | 3252126 | 11/2001 |
| JP | 2005-065501 | 3/2005 |
| JP | 2006-296235 | 11/2006 |
| JP | 4348031 B2 | 7/2009 |
| JP | 2014-176328 | 9/2014 |

OTHER PUBLICATIONS

Paste definition, Http://www.dictionary.com/browse/paste, retrieved online Sep. 28, 2018 (Year: 2018).*

(Continued)

*Primary Examiner* — Hong T Yoo
(74) *Attorney, Agent, or Firm* — Hamre, Schumann, Mueller & Larson, P.C.

(57) ABSTRACT

[Problem] There is provided a processed egg capable of making a puffed egg product which has good restorability when restored with hot water, and a method for identifying such processed egg.
[Means for solution] The processed egg is characterized by having a slope of 20 cP/min or more in viscosity measurement using a rapid visco-analyzer (RVA). The method for identifying a processed egg suitable to be puffed comprises mixing a processed egg and water, measuring viscosity of a mixture of the foregoing step using a rapid visco-analyzer (RVA), and calculating a slope in viscosity change based on a measurement result obtained from the foregoing step.

6 Claims, 2 Drawing Sheets

(56) References Cited

OTHER PUBLICATIONS

FDA, CFR—Code of Federal Regulations Title 21. Sec. 160.145 Dried Egg Whites, last amended Mar. 24, 1998. (Year: 1998).*
Onwulata, et al., "Rapid visco analysis of food protein pastes", Journal of Food Processing and Preservation, vol. 38, Sep. 20, 2013, pp. 2083-2089.
Ryu, et al., "Pasting of wheat flour extrudates containing conventional baking ingredients", Journal of Food Science, vol. 58, No. 3, May 1, 1993, pp. 567-573.
Liting, et al., "Effect of egg freshness on texture and baking characteristics of batter systems formulated using egg, flour and sugar", Journal of the Science of Food and Agriculture, vol. 96(6), Aug. 17, 2015, pp. 2047-2054.
Office Action issued in corresponding Singaporean Patent Application No. 10201601639W, dated Jan. 18, 2017, 13 pages.
Office Action issued in corresponding Singaporean Patent Application No. 10201601639W, dated Jan. 22, 2018, 7 pages.

* cited by examiner

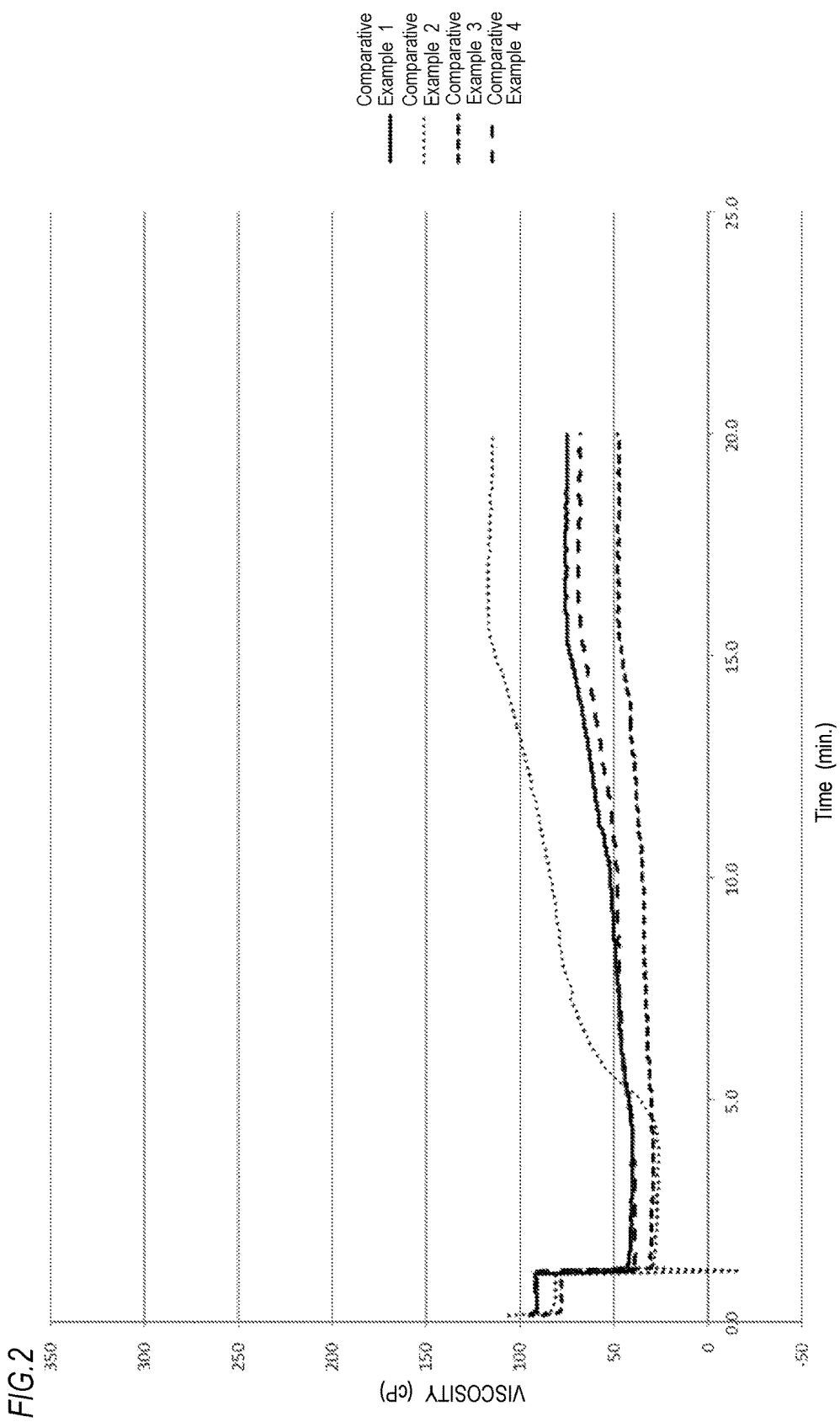

PROCESSED EGG AND METHOD FOR IDENTIFYING THE SAME

TECHNICAL FIELD

The present invention relates to a processed egg, and more particularly to a processed egg suitable for a puffed egg product with good restorability. Further, the present invention also relates to a method for identifying a processed egg suitable for a puffed egg product with good restorability.

BACKGROUND ART

Instant noodles having various dried ingredients are on the market today. Meats, vegetables, shrimps, octopuses, puffed egg products (such as scrambled eggs) and the like have been known as the type of the ingredients.

Among those ingredients, as the puffed products such as instant-type scrambled eggs which become edible after restoration with hot water, freeze-dried products or hot air-dried products are used.

The freeze-dried products are produced, for example, by pouring beaten raw eggs as a raw material into a small amount of hot water to heat and coagulate them, then allowing the coagulated eggs to pass through a metal mesh or the like to make a scrambled egg-like product having a suitable grain size, and freeze-drying the resultant product directly as it is.

On the other hand, the hot air-dried products are produced, for example, by kneading powdery eggs as a starting material along with a seasoning liquid, then heating them with microwaves or smothering them, and thereafter, drying the resultant product with hot air (for example, see Patent Document 1 and Patent Document 2).

PRIOR ART DOCUMENT

Patent Document

Patent Document 1: JP-B-3012052
Patent Document 2: JP-B-3252126

SUMMARY OF THE INVENTION

Problems to be Solved by the Invention

There is a problem that some puffed products such as hot air-dried scrambled eggs are poorly restored with hot water and this results in poor texture. One of the causes of such unfavorable scrambled eggs would be insufficient puffing of the eggs.

Factors which may have some influence on puffing would include a processed egg, a puffing agent, a temperature condition, and the like. The amount of the puffing agent to be used and the temperature condition could be controlled in some degree. However, there has been not known what type of processed eggs would have what type of influence on puffing, and there has been not known the way of identifying suitable eggs. Consequently, there has been a problem that the puffed products such as scrambled eggs having a stable quality are hardly obtained.

The present invention has been made in view of the above-mentioned problems. That is, an object of the present invention is to provide a processed egg capable of making a puffed egg product which has good restorability when restored with hot water and a method for identifying such processed egg.

Means for Solving the Problems

The inventors have closely studied a processed egg and found that a puffed egg product which uses a processed egg having a specific physical value is excellent in puffability and restorability, to complete the present invention.

To solve the above-mentioned problems, the present invention provides a processed egg which has a slope of 20 cP/min or more in viscosity measurement using a rapid visco-analyzer (hereinafter referred to as "RVA"). Preferably, the processed egg have a peak viscosity of 120 cP or more, and more preferably, the processed egg is liquid or powdery.

According to such characteristics, the processed egg having a specific value in the RVA can provide a puffed egg product having excellent puffability and restorability.

Further, to solve the above-mentioned problems, the present invention provides a method for identifying a processed egg suitable to be puffed, which comprises mixing a processed egg and water; measuring viscosity of a mixture of the foregoing step using a rapid visco-analyzer (RVA); and calculating a slope in viscosity change based on a measurement result obtained from the foregoing step.

According to such characteristics, the method enables simple identification of a processed egg capable of making a puffed egg product which is excellent in puffability and restorability.

Effects of the Invention

According to the present invention, a puffed egg product excellent in puffability and restorability can be produced. Further, the present invention can reduce poor-quality wastes by identifying a processed egg capable of obtaining a puffed egg product which is excellent in puffability and restorability, thereby reducing the production cost.

BRIEF DESCRIPTION OF THE DRAWINGS

FIG. 2 shows test results of viscosity measurement using the RVA for processed eggs of Comparative Examples.

DESCRIPTION OF EMBODIMENTS

Figure 1:
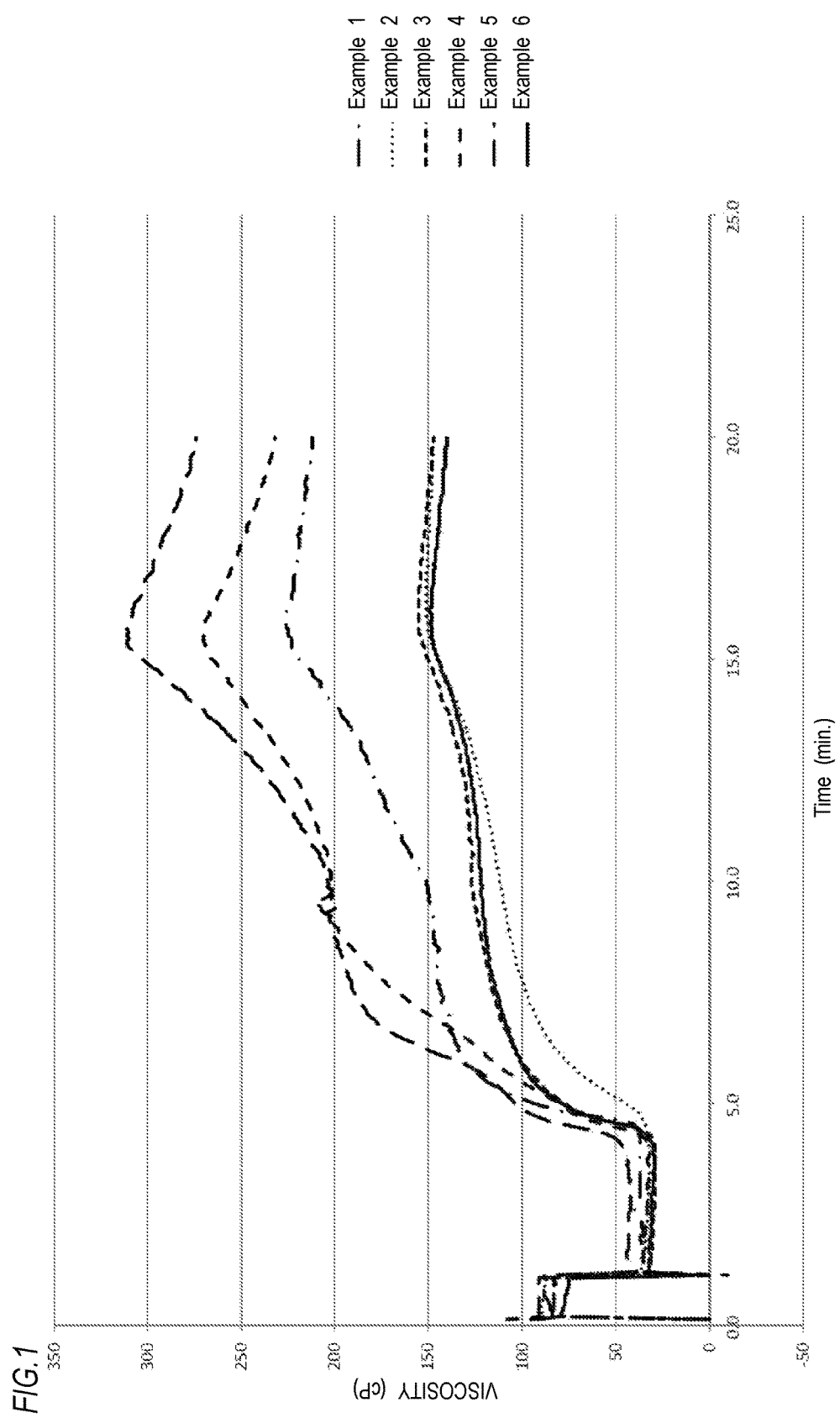
FIG. 1 shows test results of viscosity measurement using the RVA for processed eggs of Examples.

Embodiments for carrying out the present invention are described below with reference to a case of scrambled eggs using the processed eggs of the present invention. The embodiments described below are to show some examples of illustrative embodiments of the present invention. It should be noted that the scope of the present invention should not be interpreted as being narrowed by the following description.

(Processed Egg)

The processed eggs of the present invention refer to those derived from eggs by processing them in some way. Examples of processing include removal of egg shells, separation of egg yolk from egg white, chemical treatment (such as desugaring), physical treatment (such as drying and freezing), and combinations thereof.

The processed eggs used in the present invention may be either liquid or powdery. As examples of the method for producing powdery processed eggs, in the case of whole egg powder or egg yolk powder, there may be mentioned a method comprising removing egg shells, conducting sterilization, and then conducting spray drying. In the case of egg white powder, there may be mentioned a method comprising removing egg shells, conducting spray drying, and then conducting sterilization.

Preferably, the processed eggs are whole eggs, but the present invention is not limited thereto and the processed eggs may be egg yolk alone.

Among these, the processed eggs in the present invention are preferably desugared ones. In general, liquid eggs or powdery eggs would undergo Maillard reaction or protein degradation due to the influence of heat or light thereon, whereby the protein characteristics of those eggs would be readily worsened. Many of processed eggs are transported from abroad by land or by ship, and unexpected degradation of those eggs during storage in transportation would be inevitable. Therefore, for preventing the quality loss due to Maillard reaction or the like and for securing stable quality, the processed eggs are preferably desugared.

For example, the desugaring may be conducted after the removal of egg shells bur before the sterilization. The method for producing the desugared egg is not specifically limited, and any suitable ordinary method can be employed. For example, there may be mentioned a desugaring method with yeast, bacteria, enzyme or the like.

The egg yolk in the processed eggs used in the present invention may be any of those retaining a heat coagulation ability. Preferably, the egg yolk used in the present invention is desugared. For the desugaring method, the same method as above can be employed.

The egg white in the processed eggs used in the present invention may be any of those retaining a heat coagulation ability. Preferably, the egg white used in the present invention is desugared for preventing denaturing or discoloring through deterioration with age. For the desugaring method, the same method as above can be employed.

Powdery egg white is an optional component in the present invention. However, from the viewpoint of the restorability of the processed eggs, it is preferred that powdery egg white be incorporated in a ratio of egg yolk powder:egg white powder=3:1 to 1:1 (weight ratio), more preferably 2.5:1 to 1.5:1 (weight ratio). When the proportion of the egg white is larger, the processed eggs would have a harder texture. When the proportion of the egg white is smaller, the processed eggs may lose a silky texture and may have a dry and coarse texture.

As described above, specific examples of the processed eggs of the present invention include whole egg liquid, egg yolk, egg white, whole egg powder, desugarated whole egg powder, egg yolk powder, desugarated egg yolk powder, egg white powder, desugarated egg white powder, and mixture of two or more of these.

Further, the processed eggs of the present invention are preferably produced by processing eggs shortly after egg-laying such as fresh eggs which are 3 day-old or less from the egg-laying. Further, the processed eggs of the present invention are preferably stored under low temperature after the processing, for example, stored at 20° C. or less. The storing under low temperature can prevents the non-desugared eggs from denaturing and decoloring.

(Viscosity Measurement Using the RVA)

The processed eggs of the present invention have a predetermined value in viscosity measurement using the RVA. Here, the "viscosity measurement using the RVA" is conducted as follows.

<1. Step of Mixing a Processed Egg and Water>

At first, test sample is prepared by adding a processed egg to water and adequately mixing these. When the processed egg is liquid, 15 g of the water is added to 12 g of the processed egg. When the processed egg is powdery, 24 g of the water is added to 3 g of the processed egg.

<2. Step of Measuring Viscosity of a Mixture Using the RVA>

Then, the viscosity of the test sample prepared in the above-mentioned mixing step is measured by using the RVA (Perten Instruments: RVA-4500) and the experiment application program "whey protein concentration" installed in the RVA. In this program, the sample is heated, cooled and stirred according to the conditions of the table below, and the viscosity is measured over time.

TABLE 1

| Time (min.) | Temperature (° C.) | Rotation (rpm) |
| --- | --- | --- |
| 0-1.0 | 50 | 1000 |
| 1.0-4.5 | 50->80 | 320 |
| 4.5-9.5 | 80 | 320 |
| 9.5-15.0 | 80->30 | 320 |
| 15.0-20.0 | 30 | 320 |

<3. Step of Calculating a Slope in Viscosity Change Based on a Measurement Result>

Thereafter, a slope in viscosity change based on a result of the above-mentioned viscosity measurement is calculated. Here, the slope in the viscosity change refers to a value calculated by dividing the viscosity difference in a predetermined time by the predetermined time (that is, a slope). The above-mentioned predetermined value refers to this slope. In the present invention, the slope in 4.5 minutes to 6.0 minutes after the start of the measurement is 20 cP/min or more, preferably 25 cP/min or more, more preferably 30 cP/min or more. The upper limit of the slope is not particularly limited but, for example, is 300 cP/min or less, preferably 250 cP/min or less. Here, the reason why the predetermined time is set as 4.5 minutes to 6.0 minutes is that the slope in this period of time causes a difference in puffability and restorability.

Further, the processed eggs in the present invention have a peak viscosity in the viscosity measurement using the RVA. The peak viscosity refers to the highest value of the viscosity measured by the RVA over time. The peak viscosity is preferably 120 cP or more, more preferably 130 cP or more, even more preferably 140 cP or more. The upper limit of the peak viscosity is not particularly limited but, for example, is 1000 cP/min or less, preferably 850 cP/min or less.

(Processed Egg for Dried Scrambled Eggs/Processed Egg Suitable for Puffing)

Further, the present invention relates to the processed egg for dried scrambled eggs and the processed egg suitable for puffing, in which the processed egg has a slope of 20 cP/min or more in viscosity measurement using the RVA.

The processed egg of the present invention is suitable for producing dried scramble eggs. The processed egg of the present invention is also suitable for puffing by a puffing agent. The processed egg of the present invention having the predetermined physical property (in particular viscosity) adhere to the puffing agent to cover it, and is fully puffed to provide a porous structure. This porous structure enables high absorbability in hot water and thereby enabling the excellent restorability. Therefore, the dried scrambled eggs produced by using the processed egg of the present invention can be restored with hot water to be scrambled eggs having a fluffy texture.

(Method for Producing Dried Scrambled eggs)

Further, the present invention relates to a method for producing dried scrambled eggs using the processed egg having a slope of 20 cP/min or more in viscosity measurement using the RVA. The method for producing scrambled eggs is not particularly limited, and any ordinary method can be employed.

For example, a whole egg powder as a processed egg, a puffing agent and starch are mixed using a mixer. Next, the mixture is kneaded while water or a seasoning liquid is added thereto. The kneading method is not particularly limited, and a mixer may be used for kneading. Preferably, the mixture is kneaded to produce small lumps having a grain size of from 1 to 30 mm, more preferably from 2 to 15 mm.

Next, the small lump eggs obtained in the kneading step are puffed and heat-coagulated. The heating method is not particularly limited, and the small lump eggs may be microwave-heated or steamed. The microwave output ratio in heating is preferably from 0.2 to 0.3 kW/kg (for 80 to 150 seconds). The steaming time, pressure and time are preferably from 90 to 100° C., from 0.02 to 0.05 MPa, and from about 2 to about 4 minutes, respectively.

Next, the small lump eggs thus puffed and heat-coagulated are cooled to approximately room temperature as rapidly as possible. By this cooling, the porous structure of the small lump eggs can become tougher and can be fixed as such. The cooling method is not particularly limited and may be any method capable of cooling the puffed eggs as rapidly as possible. Generally, air cooling may be employed with a fan or the like. In this case, it is preferred that the cooling be carried out in a low humidity environment so that the surfaces of the small lump eggs do not get wet. If the surfaces get wet, the restorability after drying of the eggs may worsen.

Finally, the cooled small lump eggs are dried with hot air. For the drying, a fluidized bed drier or the like is used, in which the eggs are preferably dried to have a water content of at most about 5% from the viewpoint of the storability and the shape retainability thereof.

Regarding the drying temperature and time, the eggs may be dried, for example, at a low temperature of 40° C. for a long period of time of 80 minutes, or may be dried at a high temperature of 85° C. for a short period of time of 30 minutes. In consideration of the restorability and the texture, it is preferred that the eggs be dried at a relatively low temperature of from 40 to 60° C. for 80 to 60 minutes.

The puffing agent used in the present invention may be any of those capable of generating a vapor (preferably carbon dioxide) through addition of water thereto or by heating it. The vapor such as carbon dioxide or the like generated by the agent puffs the processed eggs to form a porous structure therein. As a result, the processed eggs may be restored with hot water to be scrambled eggs having a fluffy texture.

The puffing agent includes various compounds such as sodium hydrogencarbonate (baking soda), alum, magnesium carbonate, potassium bitartrate, ammonia-based synthetic puffing agent (ammonium hydrogencarbonate, ammonium carbonate), glucono-delta-lactone, and the like. Any other compounds which have a puffing capability and are usable as food can also be employed as the puffing agent.

The amount of the puffing agent to be added is preferably from 1 to 5 parts by weight relative to 100 parts by weight of the egg yolk powder. When the amount is more than 5 parts by weight, the mixture may have the taste or color peculiar to the puffing agent, which is not favorable. For example, when sodium hydrogencarbonate is used and when its amount is too large, the processed eggs containing sodium hydrogencarbonate would have a harsh taste peculiar to the agent. On the other hand, when the amount is less than 1 part by weight, puffing would be insufficient so that the processed eggs could not have the intended porous structure, and consequently, the restorability would be poor and the texture of the restored products would be poor.

In the present invention, if desired, a pH adjuster, starch or the like may be added. For example, a pH adjuster may prevent the processed eggs from being alkali-burnt or from having a harsh taste when a puffing agent which exhibits alkaline after water addition is used. Starch may provide a soft texture to the processed eggs after restoration with hot water.

(Identification Method)

Further, the present invention relates to the method for identifying a processed egg which is suitable to be puffed. The identification method of the present invention comprises a step of mixing a processed egg and water, a step of measuring viscosity of a mixture of the foregoing step using the RVA, and a step of calculating a slope in viscosity change based on a measurement result obtained from the foregoing step.

In the identification method of the present invention, "a processed egg which is suitable to be puffed" means a processed egg capable of making a puffed egg product which has good restorability when restored with hot water. For example, such processed egg may form a porous structure with almost uniform voids when being puffed.

In the identification method of the present invention, the "step of mixing a processed egg and water", the "step of measuring viscosity of a mixture of the foregoing step using the RVA", and the "step of calculating a slope in viscosity change based on a measurement result obtained from the foregoing step" can be conducted in accordance with the above-mentioned "(Viscosity measurement using the RVA)".

According to the identification method of the present invention, a processed egg capable of making a puffed egg product which is excellent in puffability and restorability can be identified the simple method. As a result, the poor-quality wastes can be reduced and the production cost can be reduced.

EXAMPLES

The present invention is described in more detail with reference to the following Examples. The characteristics of respective Examples were evaluated according to the methods described below. The present invention is not limited to these Examples.

(Viscosity Measurement)

The viscosity was measured as follows.

Test samples were prepared from the processed eggs used in Examples and Comparative Examples described below.

<Case of Liquid Sample of Processed Eggs>

15 g of distilled water was added to 12 g of the liquid sample to prepare a test sample.

<Case of Powdery Sample of Processed Eggs>

24 g of distilled water was added to 3 g of the powdery sample to prepare a test sample.

Then, the viscosity of each sample was measured by using the RVA device (Perten Instruments: RVA-4500). The experiment application program "whey protein concentration" installed in RVA-4500 was used as the measurement method. From the resultant data, a slope per a unit time and a peak viscosity were calculated.

(Restorability Test)

Hot water at 95° C. or higher was poured onto 10 g of the dry scrambled eggs of Examples and Comparative Examples and left for 3 minutes. After 3 minutes, the scrambled eggs were drained, and the weight thereof was measured. The weight increase in each sample was calculated.

(Organoleptic Evaluation)

The organoleptic evaluation was made as follows. Hot water at 95° C. or higher was poured onto the dry scrambled eggs of Examples and Comparative Examples and left for 3 minutes. After cooked, the resultant scrambled eggs were tasted by five panelists under blind condition to be evaluated based on the following evaluation criteria.

<Evaluation Criteria>
5: Soft and good texture
4: Good texture
3: Relatively poorly soft but no problem in eating
2: Poorly restored and hard somewhere
1: Poorly restored and difficult to masticate.

Example 1

A powder mixture was prepared by mixing 225 g of a-waxy cornstarch, 6 g of sodium hydrogencarbonate serving as a puffing agent, and 18 g of glucono-delta-lactone for 3 minutes.

Then, while 700 g of whole egg liquid (3 days after egg-laying) bought in a shop and a solution prepared as a seasoning liquid by adding and dissolving 40 g of sugar, 20 g of salt, 20 g of sodium glutamate and 2 g of inosinic acid/guanylic acid were added to the above powder mixture, the mixture was kneaded with a mixture at 40 rpm for 4 minutes to prepare small lump products. The mean grain size of the small lump products was 8 mm.

Then, in a household microwave oven, the small lump products were heated at 0.25 g/W for 120 seconds, and then rapidly cooled to room temperature with a cooling fan. The cooled small lump products were dried in a fluidized bed granulator at 40° C. for 80 minutes and cooled to provide scrambled eggs.

Example 2

Scrambled eggs were prepared in the same manner as Example 1, except that 250 g of a commercially-available whole egg powder (stored at low temperature after production) and 500 g of water were added to the powder mixture in place of the whole egg liquid in Example 1.

Example 3

Scrambled eggs were prepared in the same manner as Example 2, except that 250 g of a commercially-available desugared whole egg powder was added to the powder mixture in place of the whole egg powder in Example 2.

Example 4

Scrambled eggs were prepared in the same manner as Example 2, except that 250 g of a commercially-available desugared whole egg powder (produced by different manufacturer of Example 3) was added to the powder mixture in place of the whole egg powder in Example 2.

Example 5

Scrambled eggs were prepared in the same manner as Example 2, except that 185 g of a commercially-available desugared egg yolk powder and 65 g of a commercially-available desugared egg white powder were added to the powder mixture in place of the whole egg powder in Example 2.

Example 6

Scrambled eggs were prepared in the same manner as Example 3, except that the desugared whole egg powder used in Example 3 was stored at 40° C. for 2 weeks before use.

Comparative Example 1

Scrambled eggs were prepared in the same manner as Example 2, except that a commercially-available whole egg powder which is different (different lot number) from that in Example 2.

Comparative Example 2

Scrambled eggs were prepared in the same manner as Example 2, except that a mixture prepared by mixing 125 g of the whole egg powder used in Comparative Example 1 and 125 g of the whole egg powder used in Example 3 was used.

Comparative Example 3

Scrambled eggs were prepared in the same manner as Example 2, except that a mixture prepared by mixing 185 g of a commercially-available non-desugared egg yolk powder and 65 g of a commercially-available desugared egg white powder was used.

Comparative Example 4

Scrambled eggs were prepared in the same manner as Example 2, except that the whole egg powder used in Example 2 was stored at 40° C. for 2 weeks before use.

The results of the viscosity measurement of each sample are shown in FIG. 1, FIG. 2 and Table 2.

TABLE 2

|  | Desugaring | Slope (cP/min) | Peak Viscosity (cP) |
| --- | --- | --- | --- |
| Example 1 | not desugared | 60.0 | 226 |
| Example 2 | not desugared | 28.0 | 151 |
| Example 3 | desugared | 39.8 | 155 |
| Example 4 | desugared | 43.0 | 270 |
| Example 5 | desugared | 42.4 | 311 |
| Example 6 | desugared | 39.1 | 149 |
| Comparative Example 1 | not desugared | 2.6 | 76 |
| Comparative Example 2 | mixture | 19.6 | 117 |
| Comparative Example 3 | mixture | 2.0 | 48 |
| Comparative Example 4 | not desugared | 3.9 | 69 |

As observed from Table 2, the slope in all of Examples 1 to 6 was 28.0 or more. In those Examples, the whole egg liquid shortly after egg-laying had the highest value of the slope. In those Examples, the non-desugared whole egg powder (stored at low temperature) had the lowest value of the slope. The desugared powders (Examples 3 to 6) all had a relatively higher value, which was not less than 39.0. These results suggest that, in a case where powdered eggs are used, desugared powdered eggs have a higher slope value.

In all of Examples 1 to 6, the peak viscosity was not less than 140. The sample having a highest peak viscosity value in these Examples was a mixture of a desugared egg yolk powder and a desugared egg white powder (Example 5). The sample having a lowest peak viscosity value in these Examples was the long-stored sample in Example 6. There was no relationship observed between the slope and the peak viscosity. However, the slope and the peak viscosity of the whole egg liquid shortly after egg-laying were both high.

On the other hand, in all of Comparative Examples 1 to 4, the slope was less than 20.0. In particular, the slope of the samples not containing a desugared egg yolk (Comparative Examples 1, 3, and 4) was all low.

The peak viscosity value in Comparative Examples 1 to 4 was all less than 120. In those Comparative Examples, the sample showing the highest peak value was one containing desugared egg yolk in Comparative Example 2. Also in those Comparative Examples, the sample showing the lowest peak value was the long-stored sample in Comparative Example 4.

From the above results, it was found that both the slope and the peak value in Comparative Examples were lower than those in Examples. Common to Examples and Comparative Examples, the long-stored samples had a lower peak value.

Next, Example 2 and Comparative Example 1 were compared, in which whole egg powder produced by the same manufacturer was stored at a different storage temperature after powdered. From the results in Table 2, it was found that the slope was different depending on the storage temperature. The slope of the whole egg powder stored at normal temperature was only less than 10% of that of the whole egg powder stored at low temperature, and in addition, the peak value of the former was about a half of the latter.

In Comparative Example 2, the desugared whole egg powder (Example 2) and the whole egg powder which was not desugared and was stored at normal room temperature (Comparative Example 1) were mixed in equal amount. It was found that, in the case where the whole egg powders which were different in the slope were mixed, the slope of the resultant mixture lowered. The same applied to the peak value.

Next, Example 5 and Comparative Example 3 were compared. Both Example 5 and Comparative Example 3 used the same desugared egg white powder, but differed in that the egg yolk powder was desugared or was not desugared. From the results in Table 2, it was found that the slope in the case where the egg yolk powder was not desugared is lower by at least 20 times than that in the case where the egg yolk powder was desugared. In addition, it was also found that the peak value in the non-desugared one is lower by at least 6 times than that in the desugared one. From these results, it can be considered that whether to perform desugaring treatment for egg yolk would greatly affect the slope and the peak value.

Example 3 and Example 6 were compared. The slope slightly differed between the two, but could be said to be almost the same. On the other hand, when Example 2 and Comparative Example 4 were compared, it was found that the original slope of 28.0 lowered to 3.9. The same applied to the peak value. These also suggest that the slope change with the lapse of time greatly varies depending on whether to perform desugaring treatment.

The RVA device is a device of measuring the viscosity while the sample is heated. From the above-described results, it is considered that the non-desugared egg yolk would hardly coagulate due to some influence thereon. When the egg yolk coagulation is insufficient, the amount of the egg yolk to adhere to the puffing agent would be insufficient or non-uniform. As a result, it is considered that since the vapor generated by the puffing agent would leak out, the puffing of eggs would become insufficient.

Although no experiment was carried out here, when glucose were added to the combination of desugared egg yolk and desugared egg white (Example 5) and the resultant combination were stored (40° C., 2 weeks), then it would be considered that both the slope and the peak value would lower, like in Comparative Example 4. However, in this case, it would be considered that only the egg yolk and the egg kept in contact with the glucose molecules would be aged by the glucose with time and the whole mixture would not be aged.

Next, the samples were tested for the restorability and the organoleptic evaluation. The results are shown in Table 3.

TABLE 3

|  | Weight Increase Ratio | Organoleptic Evaluation |
| --- | --- | --- |
| Example 1 | 6.0 | 5.0 |
| Example 2 | 5.0 | 3.2 |
| Example 3 | 6.0 | 5.0 |
| Example 4 | 5.5 | 5.0 |
| Example 5 | 5.6 | 4.6 |
| Example 6 | 5.8 | 4.8 |
| Comparative Example 1 | 3.2 | 1.8 |
| Comparative Example 2 | 4.2 | 2.4 |
| Comparative Example 3 | 3.5 | 1.4 |
| Comparative Example 4 | 3.2 | 1.2 |

As observed from Table 3, the dry scrambled eggs of Examples 1 to 6 all had good restorability and had a good edible texture in the organoleptic test. Specifically, the weight increase ratio in Examples 1 to 6 was 5 times or more in all cases. Of those, the weight increase ratio on Example 1 and Example 3 was 6 times. On the other hand, the weight increase ratio in Example 2 was the lowest and was 5 times.

Next, referring to Comparative Examples, the results are such that the restorability was not good in every case and the organoleptic test confirmed the poor restorability. Specifically, in Comparative Example 2 showing the best restorability among those Comparative Examples, the weight increase ratio was only 4.2 times. The lowest weight increase ratio was 3.2 times in Comparative Example 1 and Comparative Example 4.

It should be noted that those having a large weight increase ratio had a good result in the organoleptic test (in other words, those having a good result in the organoleptic test had a large weight increase ratio). In order to have a large weight increase ratio, the samples need to have good hot water absorbability, and in order to have good hot water absorbability, the samples need to be fully puffed to have a porous structure. Here, as described above, those having a large slope in the RVA measurement could well adhere to a puffing agent to cover it, and could be therefore fully puffed to provide a porous structure. In fact, with reference to the results in Table 2, the scrambled eggs formed of the processed eggs having a high slope all had good restorability in general. On the other hand, the scrambled eggs formed of the processed eggs having a low slope all had poor restorability in general. From these, it can be said that the results in the RVA are effective for identifying processed eggs of good restorability.

As described above, slope determination in the RVA measurement provides a simple method for identifying a processed egg which is excellent in puffability and restorability. Accordingly, the present invention can reduce poor-quality wastes so that the production cost can be reduced.

The invention claimed is:

1. A powdery processed egg having a slope of at least 20 cP/min in a viscosity measurement obtained with a mixture of the powdery processed egg and water using a rapid visco-analyzer according to following measuring conditions:
   (i) during a time from 0 minute to 1.0 minute, a temperature being 50° C. and a rotation speed being 1000 rpm,
   (ii) during a time from 1.0 minute to 4.5 minutes, the temperature being increased from 50° C. to 80° C. and the rotation speed being 320 rpm,
   (iii) during a time from 4.5 minutes to 9.5 minutes, the temperature being 80° C. and the rotation speed being 320 rpm,
   (iv) during a time from 9.5 minutes to 15.0 minutes, the temperature being decreased from 80° C. to 30° C. and the rotation speed being 320 rpm, and
   (v) during a time from 15.0 minutes to 20.0 minutes, the temperature being 30° C. and the rotation speed being 320 rpm,
   wherein the slope is calculated by dividing a difference of the measured viscosity in a predetermined time by the predetermined time, where the predetermined time is a time period from 4.5 minutes to 6.0 minutes after starting of the viscosity measurement, and
   the powdery processed egg is a desugared egg.

2. The powdery processed egg according to claim 1, wherein the powdery processed egg has a peak viscosity of at least 120 cP in the viscosity measurement.

3. The powdery processed egg according to claim 1, wherein the powdery processed egg has the slope of the viscosity change in a range from 20 cP/min to 300 cP/min.

4. The powdery processed egg according to claim 1, wherein the viscosity measurement is performed with the mixture of the powder processed egg and the water at an amount ratio of 1:8 by mass, respectively.

5. A method for identifying a powdery processed egg that is suitable for puffing, comprising:
   mixing the powdery processed egg and water;
   measuring viscosity of a resulting mixture of the mixing, using a rapid visco-analyzer according to following measuring conditions:
      (i) during a time from 0 minute to 1.0 minute, a temperature being 50° C. and a rotation speed being 1000 rpm,
      (ii) during a time from 1.0 minute to 4.5 minutes, the temperature being increased from 50° C. to 80° C. and the rotation speed being 320 rpm,
      (iii) during a time from 4.5 minutes to 9.5 minutes, the temperature being 80° C. and the rotation speed being 320 rpm,
      (iv) during a time from 9.5 minutes to 15.0 minutes, the temperature being decreased from 80° C. to 30° C. and the rotation speed being 320 rpm, and
      (v) during a time from 15.0 minutes to 20.0 minutes, the temperature being 30° C. and the rotation speed being 320 rpm,
   calculating a slope of a viscosity change based on the viscosity measured in the measuring, wherein the slope is calculated by dividing a difference of the measured viscosity in a predetermined time by the predetermined time, where the predetermined time is a time period from 4.5 minutes to 6.0 minutes after starting of the viscosity measurement; and
   selecting the powdery processed egg having the slope of the viscosity change of at least 20 cP/min from powdery processed eggs whose slopes of the viscosity change have been measured,
   wherein the powdery processed egg is a desugared egg.

6. The method for identifying a powdery processed egg according to claim 5, wherein an amount ratio of the powdery processed egg and water in the mixing is 1:8 by mass, respectively.

* * * * *